United States Patent
Rowles et al.

(10) Patent No.: US 9,244,682 B2
(45) Date of Patent: Jan. 26, 2016

(54) IDLE DETECTION

(71) Applicant: iolo technologies, LLC, Los Angeles, CA (US)

(72) Inventors: Noah Tilman Rowles, Pasadena, CA (US); Daniel Harlan Hawks, University City, MO (US); Dennis Barry Bottrell, La Crescenta, CA (US)

(73) Assignee: iolo technologies, LLC, Pasadena, CA (US)

( * ) Notice: Subject to any disclaimer, the term of this patent is extended or adjusted under 35 U.S.C. 154(b) by 257 days.

(21) Appl. No.: 13/683,978

(22) Filed: Nov. 21, 2012

(65) Prior Publication Data

US 2013/0151839 A1 Jun. 13, 2013

Related U.S. Application Data

(60) Provisional application No. 61/562,557, filed on Nov. 22, 2011.

(51) Int. Cl.
*G06F 9/06* (2006.01)
*G06F 11/34* (2006.01)

(52) U.S. Cl.
CPC .............. *G06F 9/06* (2013.01); *G06F 11/3438* (2013.01)

(58) Field of Classification Search
CPC . H04W 52/0258; G06F 1/3203; G06F 1/3206
USPC .......................................... 713/300, 320, 323
See application file for complete search history.

(56) References Cited

U.S. PATENT DOCUMENTS

| | | | |
|---|---|---|---|
| 5,355,501 A | 10/1994 | Gross et al. | |
| 6,092,219 A | 7/2000 | Porterfield | |
| 6,360,336 B1 | 3/2002 | Christensen et al. | |
| 7,272,751 B2 | 9/2007 | Beacom et al. | |
| 2011/0135283 A1* | 6/2011 | Poniatowki et al. | 386/297 |
| 2014/0211640 A1* | 7/2014 | Tahir et al. | 370/252 |

OTHER PUBLICATIONS

Patent Cooperation Treaty, International Searching Authority, Notification of Transmittal of the International Search Report and the Written Opinion dated Feb. 5, 2013 for International Application No. PCT/US2012/066396, International Filing Date Nov. 21, 2012, 9 pages.
Patent Cooperation Treaty, International Bureau of WIPO, Notification Concerning Transmittal of International Preliminary Report on Patentability dated Jun. 5, 2014 for International Application No. PCT/US2012/066396, International Filing Date Nov. 21, 2012, 7 pages.

* cited by examiner

*Primary Examiner* — Mohammed Rehman
*Assistant Examiner* — Alyaa T Mazyad
(74) *Attorney, Agent, or Firm* — Brokaw Patent Law PC; Christopher J. Brokaw (57) ABSTRACT

Idle detection techniques are disclosed. A set of idle conditions that includes one or more conditions not comprising or triggered by an absence of user input is monitored. The device is determined to be idle based at least in part on results of the monitoring. The device may be determined not to be idle even in the absence of recent user input.

32 Claims, 9 Drawing Sheets

| 1st level of tests for an idle state | Use |
|---|---|
| Full screen mode<br>Are any applications (not including screensavers) currently running in full screen mode? | Used to detect when the user is watching a movie or playing a video game. Full screen mode is commonly used for movies or video games, activities that may not require interaction with the mouse or keyboard. |
| Display adapter activity<br>Has the video display adapter changed its matrix of pixels beyond a specified threshold? | Used to detect when the computer's video display has changed. Video display commonly changes significantly when a computer system is being used for foreground or high-priority operations. |
| CPU usage<br>Does the current CPU usage exceed a specified threshold? | Used to detect when a resource-intensive process is running unattended, such as a significant data transmission, complex mathematical calculation, or full system security scan. |
| Network adapter utilization<br>Does a network adapter's utilization exceed a specified threshold? | Used to detect when large amounts of data are being transferred over a network. Examples include downloading a large file from the internet, uploading files to a remote server, or copying data to or from another computer on a network. |
| Storage device access/access rate<br>Has a specified storage device been accessed, or has such access exceeded a specified transfer rate threshold? | Used to detect when data is being transferred to or from a hard drive or other local storage device. Examples include copying or moving data to or from another place either on a network or the same computer, performing disk defragmentation, or a data backup. |
| CD/DVD usage<br>Is a CD or DVD drive currently being accessed by another process? | Used to detect when the user is watching a movie, listening to music, playing a game, installing a program, or accessing data from optical storage media. |

FIG. 3B

| 1st level of tests for an idle state | Use |
|---|---|
| USB or other data transport or adapter usage<br>Is data being transmitted through a USB or other similar adapter? | Used to detect when data is being transferred by USB or similar controller. Examples include sending data to or receiving data from a USB storage device, or sending a document to a printer through a USB connection. |
| Data transport through specified ports<br>Is data being transmitted through any specified ports (e.g. HTTP, FTP, COM, LPT, etc.)? | Used to detect when data is being transferred through one or more specified ports. Examples include sending a document through an LPT port to a printer connected to the computer, data being received through an HTTP port, or a file being transmitted through an FTP port. |
| Memory usage<br>Is system memory being allocated or de-allocated beyond a specified threshold? | Used to detect when a new or running program (including the operating system) marshals or dismisses significant quantities of RAM, which may signify the existence of high priority or foreground system activity. |
| Sound usage<br>Is sound being played through a sound controller? | Used to detect when the user is watching a movie, listening to music, or playing a game. |

FIG. 3C

| 2nd level of tests for an idle state | Use |
|---|---|
| Specified times<br>Is the current system time between specified times? | Allows the user to specify a time period when the computer should not be considered idle, regardless of other conditions. For example, a user may specify the 8 hours of a standard workday as a time period during which the PC should not be considered idle. This post-condition can also be used to detect when another process is scheduled to run, such as a system backup or a security scan. |
| CPU usage<br>Does the average CPU usage over the idle period exceed a specified threshold? | Used to detect when a resource-intensive process is running unattended. Unlike the CPU usage idle condition, this post-condition allows for periodic spikes in CPU usage. |
| Network utilization<br>Does the average network utilization over the idle period exceed a specified threshold? | Used to detect when large amounts of data are being transferred over a network unattended. Unlike the network utilization idle condition, this post-condition allows for periodic spikes in network utilization. |
| Storage media access rate<br>Does the average storage media access rate over the idle period exceed a specified threshold? | Used to detect when hard drive, flash memory, SSD, or other storage media and/or drive maintenance is taking place. Unlike the storage media access rate idle condition, this post-condition allows for periodic spikes in the storage media access rate. |

IDLE DETECTION

CROSS REFERENCE TO OTHER APPLICATIONS

This application claims priority to U.S. Provisional Patent Application No. 61/562,557 entitled IDLE DETECTION filed Nov. 22, 2011 which is incorporated herein by reference for all purposes.

BACKGROUND OF THE INVENTION

With idle-detection technology, software and hardware tools can be controlled depending on whether or not a computer or other device is in use and/or otherwise in a state in which relatively lower priority and/or less time critical operations can be performed without interfering or interfering unduly with user activity or other higher priority tasks. This technology has many practical applications for computers or other devices in a home, business, or school setting.

Conversely, reliable detection of a transition of a computer or other device out of an idle and/or other state in which lower priority operations can be performed enables such lower priority operations to be terminated and deferred until a later opportunity to perform or complete them arises.

Traditional idle-detection methods can detect if a human-interaction device such as a mouse, keyboard, or touch-screen has not been used for a certain amount of time. While useful, this approach has a drawback—the system may still be actively engaged in high-priority activities even if a user is not using the mouse, keyboard, touch screen, or other human-interaction device. For instance, if a user is watching a video, playing music, or waiting for a time-sensitive but long-term operation to finish (such as downloading a file from a remote server), a mouse, keyboard, or touch screen may not be used for some time, but the computer is still in use and is not truly idle. Similarly, non-workstation computers such as servers may seldom receive direct interaction by mouse or keyboard and thus traditional idle-detection methods are not accurate or useful.

BRIEF DESCRIPTION OF THE DRAWINGS

Various embodiments of the invention are disclosed in the following detailed description and the accompanying drawings.

FIGS. 3B and 3C show tables of first level idle conditions used in some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting that a computer or other device is "idle", such that relatively lower priority tasks may be performed, is disclosed. In various embodiments, In various embodiments, the term "idle state" is used to refer to a state in which a device and/or one or more resources of the device are not being used to perform operations considered to be of a sufficiently high priority, or device resources are not being used at a level of intensity, that the operations should not be interrupted or competed with by, or such resources should not be diverted to any extent to, one or more relatively lower priority operations. The term "idle condition" is used in connection with some embodiments to refer to a condition that indicates whether and/or an extent to which the device has entered and/or exited such an idle state.

As noted above, idle detection technology as disclosed herein may be used to enable software and hardware tools to be controlled at least in part based on whether or not a computer or other device is in use and/or otherwise in a state in which relatively lower priority and/or less time critical operations can be performed without interfering or interfering unduly with user activity or other higher priority tasks. For example, in various embodiments idle-detection technology may be used in one or more of the following ways:

Routine system maintenance, or other relatively lower priority tasks that should not interrupt higher priority operations and/or foreground usage (e.g., non-critical or non-time-sensitive transmission of data over networks or the Internet, file/data backup, etc.), can be run automatically during idle-time, or at other times when operations or usage that should are relatively higher priority and/or otherwise should not be interrupted or competed with, rather than following a set schedule that may interrupt the user or higher priority activity.

System repairs can be delayed until the computer is not in use, freeing up more CPU and RAM to handle resource-intensive repairs.

The computer can be automatically shut down, or put into a more energy efficient state (e.g. sleep, hibernate, standby), if it has been idle for a specified length of time, resulting in reduced energy costs.

Employee productivity can be monitored.

The computer can be automatically locked if it has been idle for a specified length of time, resulting in increased security.

A user can be logged out of a program or network connection, resulting in increased security.

Conversely, reliable detection of a transition of a computer or other device out of an idle and/or other state in which lower priority operations can be performed enables such lower priority operations to be terminated, suspended, paused, and/or deferred until a later opportunity to perform or complete them arises.

In some embodiments, idle-detection as disclosed herein can determine when any applications are running in full screen mode (often used when playing a game or when viewing movies and videos) or when CPU or other processor usage exceeds a specified threshold, thereby detecting when other processor-intensive system activities are occurring.

In some embodiments, idle detection is optimized to have a small footprint, i.e., the idle detection process uses minimal CPU and RAM resources.

To be detected as idle, in some embodiments the computer or other device must remain uninterrupted and otherwise satisfy idle conditions for a designated amount of time. What determines if the device is in use in various embodiments include tests for user input supplemented with the use of one or more configurable idle conditions. In some embodiments, two or more levels of conditions are evaluated. Once conditions comprising a first level of conditions have been determined to have remained satisfied through a prescribed detection period, a series of one or more subsequent condition levels are evaluated to determine whether the device has entered an "idle" or other state in which lower priority operations are permitted. While two or more levels of detection conditions are considered in some embodiments described herein, in other embodiments only a single set of detection conditions evaluated in a single detection level is used.

Figure 1:
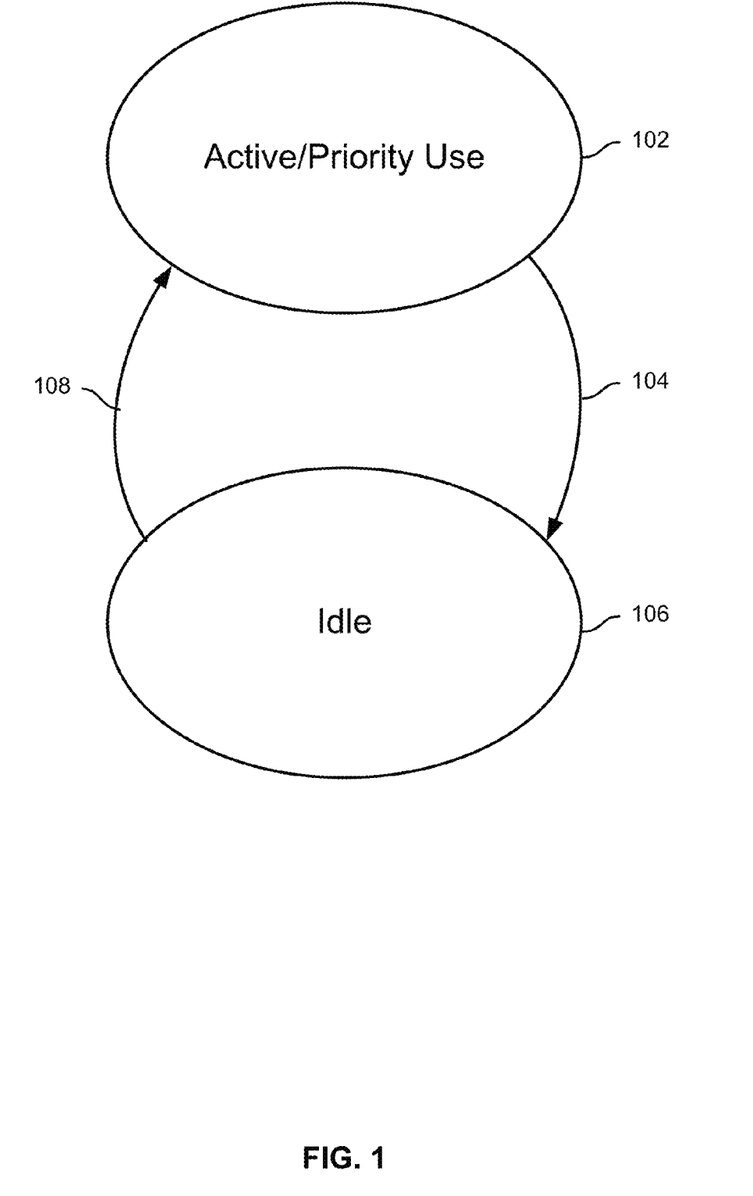
FIG. 1 is a state diagram illustrating an embodiment of a process to detect an idle state.

FIG. 1 is a state diagram illustrating an embodiment of a process to detect an idle state. In the example shown, a computer or other device may be in an active and/or priority use state 102. In the active and/or priority use state 102, for example, one or more priority processes and/or tasks may be being performed, such that one or more less urgent tasks may be desired and/or required to be deferred, so as not to interfere (potentially) with and/or delay performance of the relatively higher priority process(es) and/or task(s). Upon determining that one or more idle state detection criteria have been met, the computer or other device undergoes a first transition 104 to an idle state 106, in which one or more lower priority tasks may be performed. Detection of an event or other data indicative of a need to undergo a second transition 108 out of the idle state and back into the active/priority use state 102 results in the example shown in the computer or other device transitioning back to the active/priority use state 102. Examples include, without limitation, detecting receipt of a user input, e.g., via mouse movement, touch screen interaction, button clicks, or keyboard keystrokes. In some embodiments, user input is detected by querying the computer or other device via an application programming interface (API) or device driver. If user input has been registered, the device transitions back to the active/priority use state 102.

Figure 2:
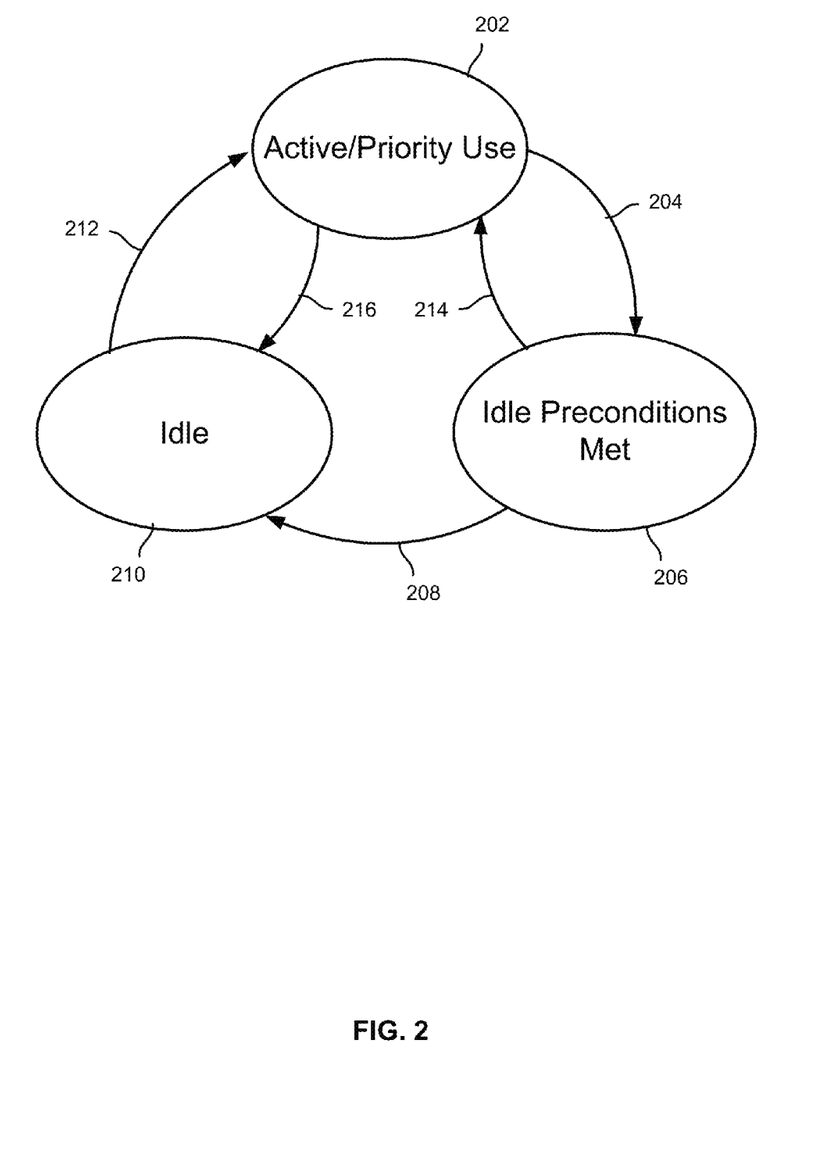
FIG. 2 is a state diagram illustrating an embodiment of a two-stage process to detect an idle state.

FIG. 2 is a state diagram illustrating an embodiment of a two-stage process to detect an idle state. In the example shown, the computer or other device may be in an active/priority use state 202. A transition 204 to an "idle preconditions met" state 206 occurs, e.g., upon determination that a first set or level of idle condition tests have been determined to have been satisfied. If a user input or other event requiring lower priority tasks to be stopped, deferred, and/or de-prioritized occurs, the computer or other device undergoes a transition 214 back to the active/priority use state 202. If instead a second level of idle conditions are determined to be satisfied, the computer or other device undergoes a transition 208 from the "idle preconditions met" state 206 to an idle state 210. In various embodiments, while the computer or other device is in idle state 210, relatively lower priority tasks are performed. If while in the idle state 210 a user input or other event requiring lower priority tasks to be stopped, deferred, and/or de-prioritized occurs, the computer or other device undergoes a transition 212 back to the active/priority use state 202. In the example shown, the a transition 216 directly from active/priority use state 202 to idle state 210 is shown as being possible. For example, an explicit user input such as selection of a "sleep" or other control may be received and may indicate that user is not currently actively using the computer or other device.

In some embodiments in which two or more levels of detection are used, idle conditions and idle post-conditions are used as follows:

1. Idle can be interrupted by the user, such as via a mouse or keyboard, or if any first level condition is not met at any point during the idle detection process. Examples of idle conditions include point-in-time conditions (e.g., CPU usage exceeds X%) and conditions determined during a span of time (e.g., CPU usage reaches an average of above Y% for longer than Z length of time).
2. If an idle state (determined as in 1) is maintained throughout the specified period, then in some embodiments a series of specified second level conditions are tested.
3. If all specified second level conditions are met, the PC or other device is deemed to be in a state in which one or more relatively lower priority operations may be performed.

Figure 3A:
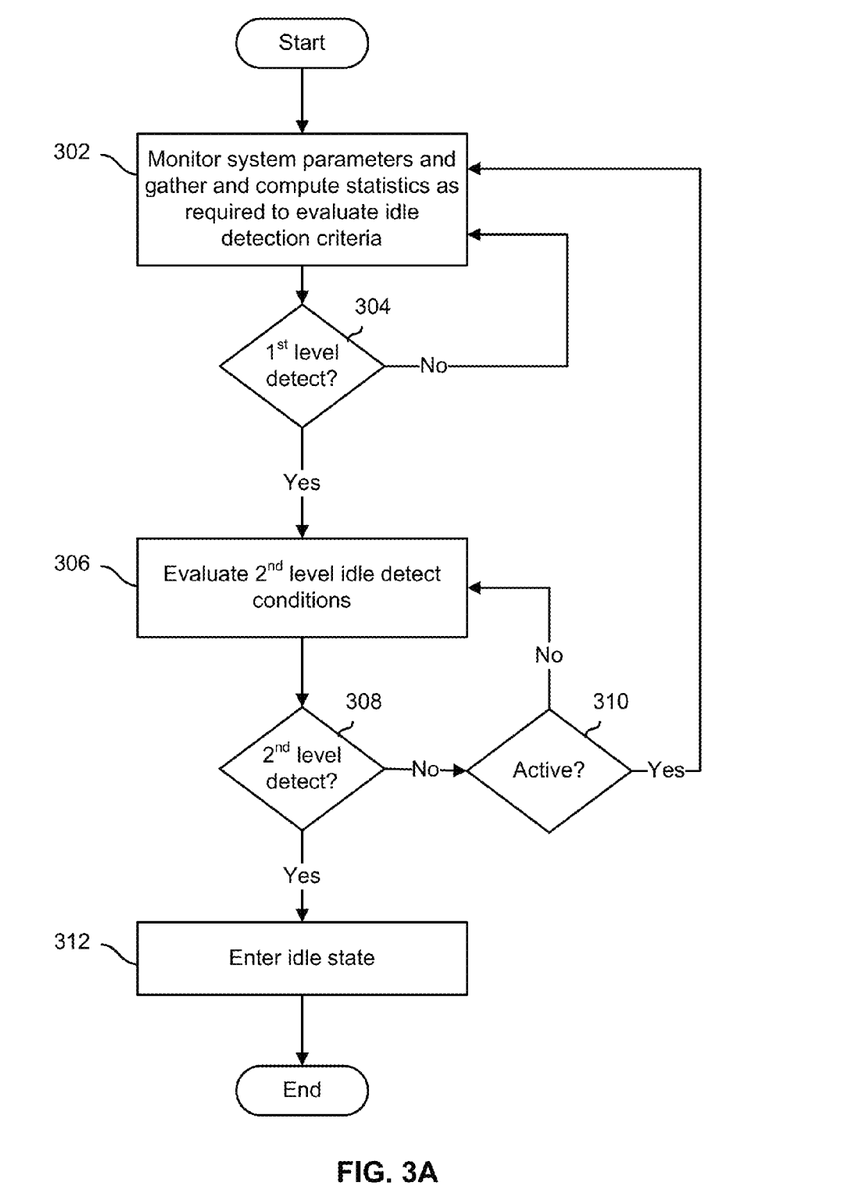
FIG. 3A is a flow diagram illustrating an embodiment of a two-stage process to detect idle conditions and enter into an idle state.

FIG. 3A is a flow diagram illustrating an embodiment of a two-stage process to detect idle conditions and enter into an idle state. In the example shown, system parameters are monitored and statistics are gathered and/or computed as necessary to be able to evaluate applicable idle detection criteria (302). In some embodiments, the criteria to be applied and/or for each of at least a subset of the criteria an associated threshold or other detection value to be used may be defined, for example by an administrative user via an administrative user interface. In the example shown in FIG. 3A, first level idle conditions are tested until all first level idle conditions have been determined to have been met (304). In some embodiments, to minimize use of CPU, memory, and/or other resources first level idle conditions are tested serially. If any condition is determined not to have been met, the process resets and starts over. In some embodiments, receipt of a user input, e.g., via an input device, causes the process of FIG. 3A to reset and start over. If the first level idle conditions are determined to have been met (304), one or more second level idle conditions are evaluated (308). If active use of the device is detected (310) prior to all second level idle conditions being determined to have been met, the process of FIG. 3A starts over, for example, once a check for recent user input indicates that no user input has been received within a prescribed time. If all second level idle conditions are determined to have been met (308) prior to any indication of active use having been received (310), the computer or other device enters the idle state (312).

While in various embodiments described herein first level idle conditions and second level idle conditions are tested for separately in a two stage process, in some embodiments, only one stage or, alternatively, two or more stages of processing may be performed.

Figure 3C:
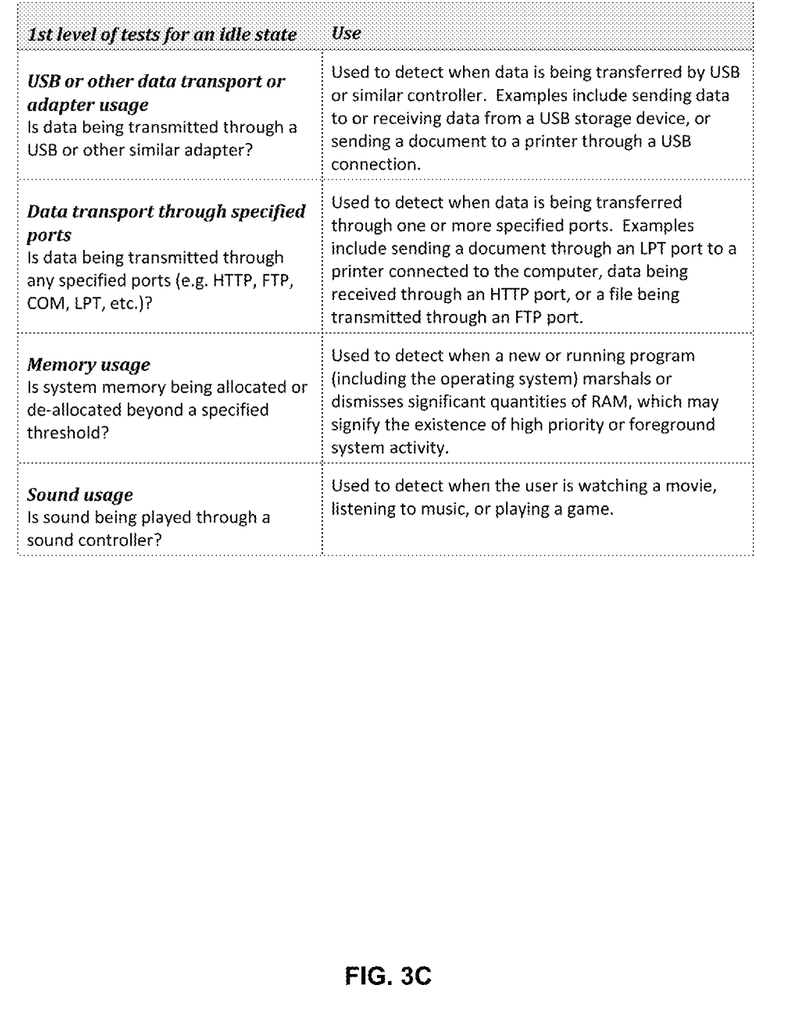

FIGS. 3B and 3C show tables of first level idle conditions used in some embodiments. In some embodiments, one or more of the idle conditions shown in FIGS. 3B and 3C may be checked for in connection with steps 302 and 304 of FIG. 3A. The first level idle conditions shown in FIG. 3B include checking to determine whether any application other than a screen saver is running in "full screen" mode (e.g., movies or video games often run in this mode); display adapter activity; CPU usage; network adapter utilization; storage device access and/or access rate; and CD/DVD and/or other removable optical or other storage media usage. The first level idle conditions shown in FIG. 3C include USB or other data transport or adapter usage; data transfer through specified ports; memory usage; and sound usage. In various embodiments, one or more of the idle conditions in FIGS. 3B and 3C may be used to detect whether resources are being used and/or being used intensively, despite the absence of (recent) user input, possibly indicating that a relatively higher priority usage, task, or operation is being performed, such that the state of the device should not be transitioned into an "idle" state in which relatively lower priority operations are allowed to be performed.

Note that not all of the conditions shown in FIGS. 3B and 3C may apply to a particular device or a particular type of device. For example, even relatively low priority or otherwise interruptible applications on smart phones and other mobile devices may run in full screen mode. In some embodiments, a user or administrator configurable set of idle detection conditions applicable to the particular device and/or desired by the user or administrator are used.

Figure 3D:
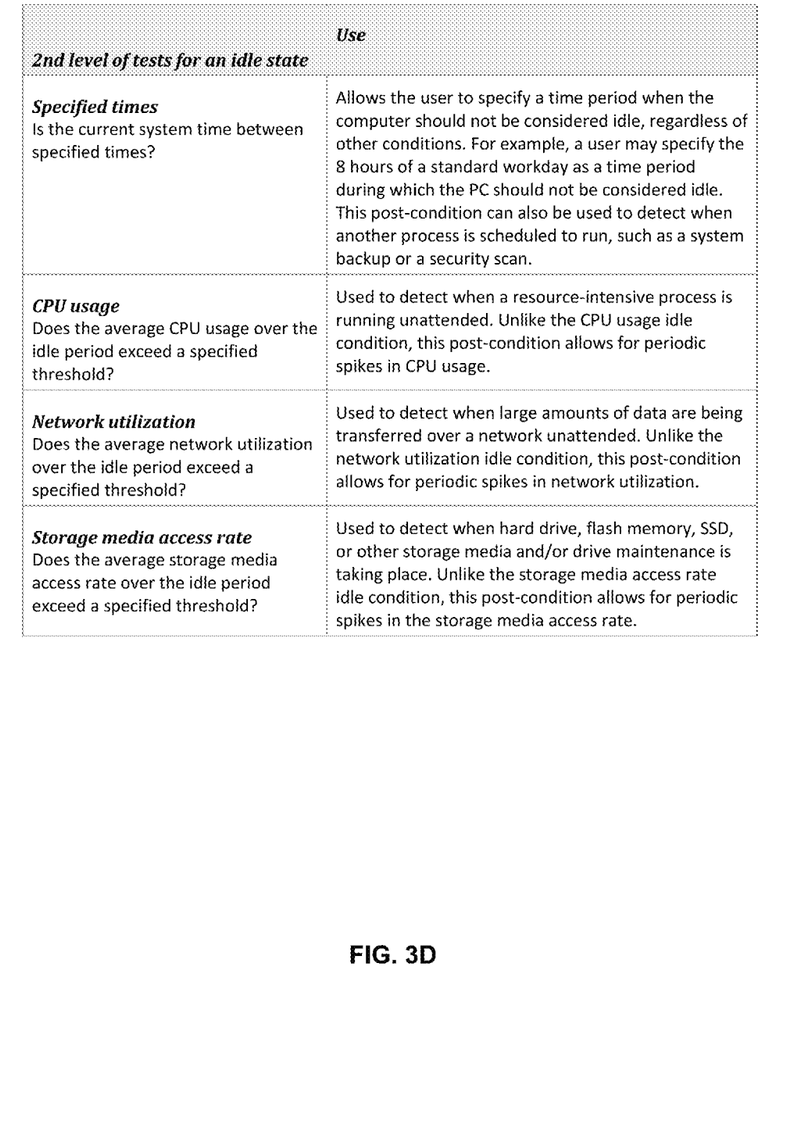
FIG. 3D shows a table of idle post-conditions (i.e., "second" or subsequent level conditions) used in some embodiments.

FIG. 3D shows a table of idle post-conditions (i.e., "second" or subsequent level conditions) used in some embodiments. In some embodiments, one or more of the idle post-conditions shown in FIG. 3D may be checked for in connection with steps 306 and 308 of FIG. 3A. In some embodiments, only one level of idle conditions are checked and in some such embodiments one or more of the conditions shown and described in FIG. 3D may be included in that level. The idle conditions shown in FIG. 3D include checking whether the current time is within a time period when the user and/or an administrator has indicated lower level operations should not be performed, for example to keep the computer or other device in a state of maximum availability to perform higher priority tasks. Other conditions shown in FIG. 3D include a test for CPU usage (e.g., average CPU usage over an idle check period); network utilization (e.g., average network utilization over a prescribed period), and hard drive access rate (e.g., average hard drive access rate over the idle period, which may detect that high priority hard drive maintenance is being performed). Note that in the example shown in FIG. 3D certain of the conditions involve comparing average usage, for example over an idle check period, which in some embodiments may allow an idle state to be entered even if there have been occasional spikes in the usage of the resource during the idle period.

While in the table shown in FIG. 3D the second level conditions computed over a period of time (e.g., average resource usage) have a corresponding point in time condition in the first level, in some embodiments a second level condition or other average over time condition may not necessarily have a point in time counterpart condition. For example, in some embodiments one may not want to consider a computer un-idle if the CPU usage spikes for an instance of time, regardless of how high it spikes, yet one may still want to consider that system un-idle if the CPU usage has averaged at least X over Y period, or had at least Z spikes above a certain threshold over a time period. Similarly, in some embodiments any first level or other point in time condition may have a corresponding average or other usage over time counterpart condition and associated threshold.

While in the example described in the tables above and the flow chart below the average conditions in the second level are computed over a same idle detection period during which the first level conditions are determined to have been met, in some embodiments averages may be computed over a different period that the first level detection period, for example for each second level condition an average may be computed over a configured or configurable rolling window, etc. In various embodiments, the tests performed, the measures used and/or thresholds applied, and/or the order in which conditions are tested may vary depending on the device and the purpose for which idle detection is being performed. In addition, conditions and tests not mentioned explicitly in this disclosure may be required to detect an idle state (or other state in which relatively lower priority tasks may be performed), depending on such factors as the attributes of a particular device and how it is used. In some embodiments, idle condition thresholds may be adjusted dynamically, for example to lower thresholds as a relative priority of a task waiting for idle detection to be performed increases, for example with time or due to other factors or conditions.

In some embodiments, idle conditions in one or more levels or stages may be checked serially, i.e., one by one. In some embodiments, a serial approach conserves CPU and/or other resources by only performing one idle condition (or another prescribed subset of idle conditions) at any one time. In some embodiments, one or more second or other subsequent level idle conditions may be used to detect situations in which a higher priority use of the computer or other device may not be detected by a check performed at a particular point in time when the use may not have been manifested in the idle condition test parameter(s) at the moment that particular condition was checked. For example, a higher priority use that uses a particular resource over time but not continuously might be missed by a check at one point in time to determine whether that resource is being used (or being used more than a prescribed threshold amount). However, if a first level idle condition that checked for use of that resource was determined to have been met, a corresponding second level condition that checks the average use of that resource over a period of time may detect the higher priority use, resulting in the computer or other device not transitioning into the idle state.

Figure 4:
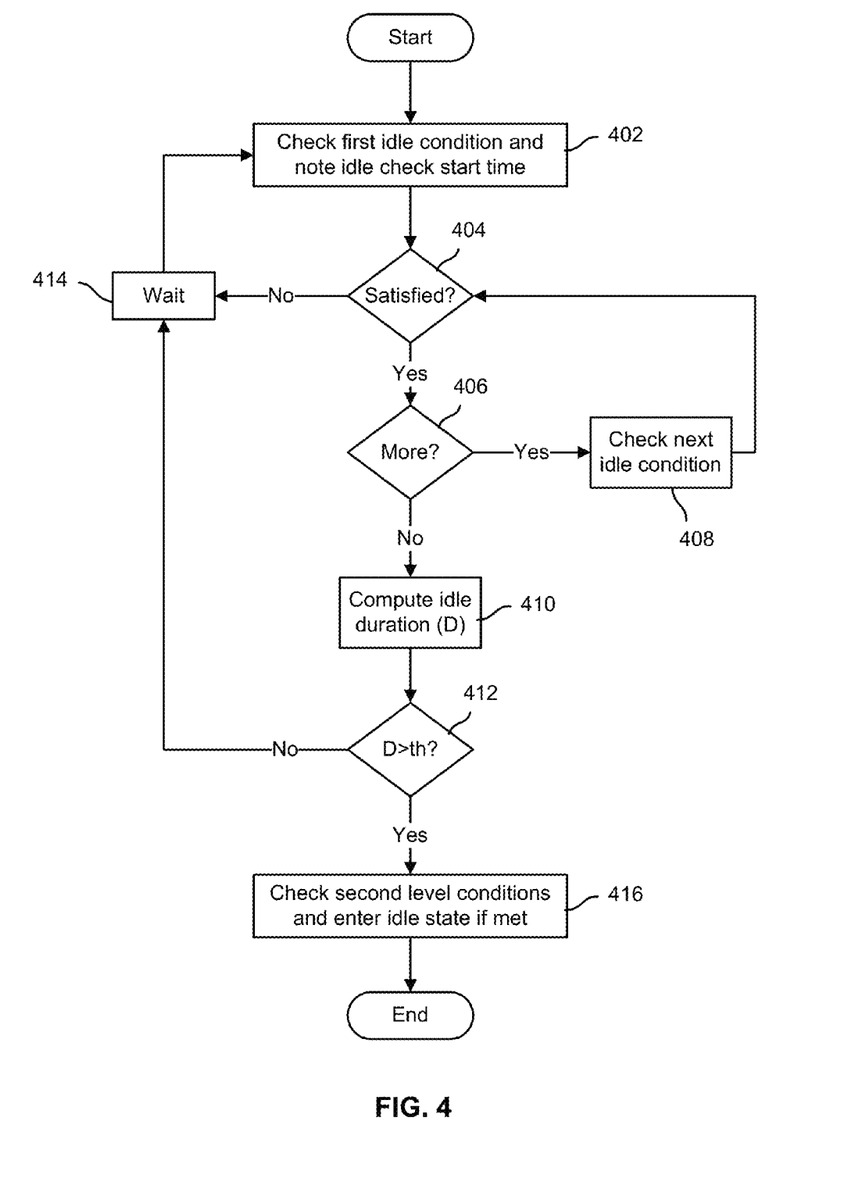
FIG. 4 is a flow diagram illustrating an embodiment of process to detect an idle condition.

FIG. 4 is a flow diagram illustrating an embodiment of process to detect an idle condition. In the example shown, idle conditions are tested serially, one after the other, and in this example the first level conditions are determined to have been met if each condition in the sequence was determined to have been satisfied at the time that condition was checked, and if the "idle duration" period over which the conditions were tested is greater than a prescribed threshold. In some embodiments, this approach enables idle detection to be performed with a minimal use of system resources. In the example shown, once an absence of (recent) user input is detected, the process starts. A first idle condition in the set of first level conditions is tested, and the start time of the current idle period is noted (402). If the condition is satisfied (404), the process moves on to the next check in the first level idle condition set (406, 408), and iterates through the conditions as each is passed. If any condition in the set is determined not to have been met (404), the entire process starts over, in this example after a prescribed wait (414). In some embodiments, the process starts over without a wait. If all the first level idle conditions are met (402, 404, 406, 408), an idle period duration is computed (410), for example by comparing a current time to the previously recorded idle period start time. If the idle period duration does not exceed the prescribed threshold (412), the process of FIG. 4 starts over after a prescribe wait (414). If the idle period duration exceeds the prescribed threshold (412), the first level idle conditions are determined to have been met and processing advances to checking the second level idle conditions, and if the second level conditions are met the system enters into an idle state (416). In some embodiments, the second level conditions are checked serially, in a manner similar to that described above in connection with the first level conditions.

Figure 5:
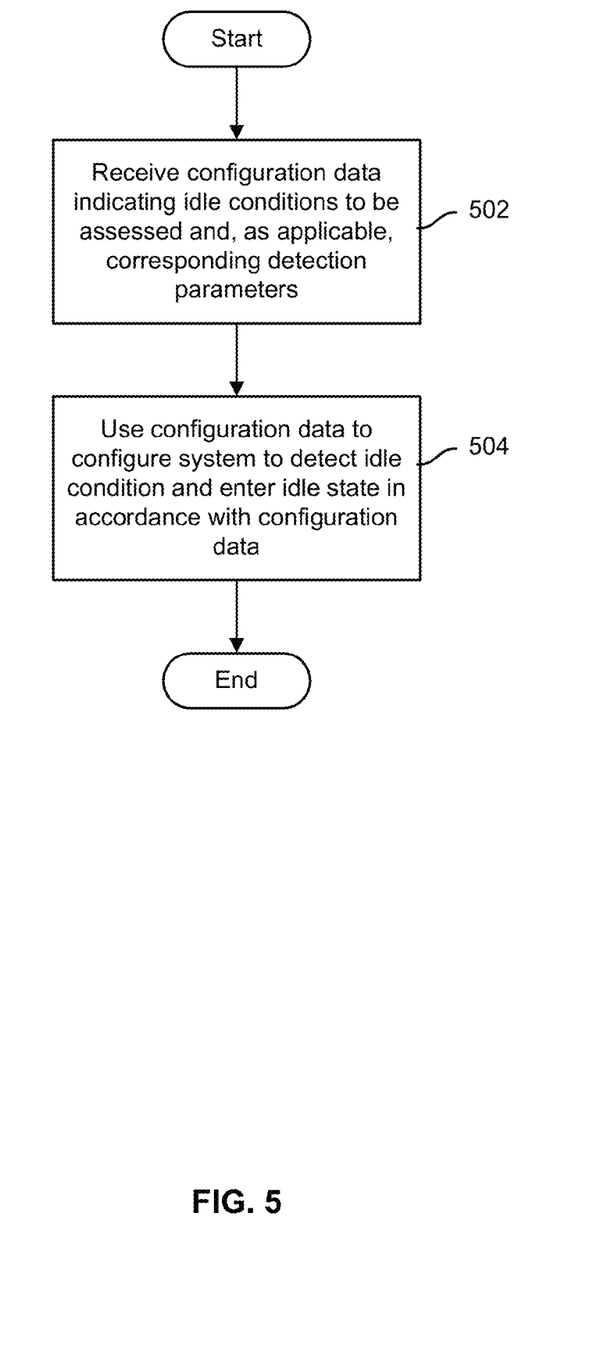
FIG. 5 is a flow diagram that illustrates an embodiment of a process to configure a computer or other device to detect an idle condition.

FIG. 5 is a flow diagram that illustrates an embodiment of a process to configure a computer or other device to detect an idle condition. In the example shown, configuration data is received indicating idle conditions to be assessed and, as applicable, corresponding thresholds and/or other parameters to be used to perform the check (502). In various embodiments, one or more of an API, a configuration file, and/or preferences entered via a graphical or other administrative user interface are used to provide and/or receive the configuration data. The received configuration data is used to configure the system, such as a computer or other device, to detect the configured idle condition(s) in the manner indicated in the configuration data (504).

In some embodiments, the idle conditions to be checked and/or the thresholds or other parameters to be used to check them may vary (e.g., as configured, depending on the time of day and/or day of the week; geographic location, such as whether the device is located in the home, place of business, or somewhere in between; etc.). In some embodiments, the idle conditions to be checked and/or associated thresholds or other parameters are or may be learned, for example by a behavioral learning or other artificial intelligence process configured to observe use of the device under "normal" conditions and to select idle conditions to be tested and/or to set associated thresholds and/or other parameters based at least in part on system parameter values as observed during the learning period. In some embodiments, learned parameters may be adjusted over time, for example based on subsequently observed actual use of the device.

In some embodiments, one or more of the idle conditions tested for and/or the thresholds and/or other parameters used to perform them may be determined dynamically and programmatically, for example at system run time, based on monitored, observed, and/or reported system and/or environmental conditions, for example, such as and without limitation based on behavior and/or system interaction observed locally (e.g., successive relatively short periods in the "idle" state, perhaps indicating an ongoing or frequent priority use that the configured idle conditions are not detecting); conditions observed in a local environment (e.g., adjacent devices in a local area network, local server farm, etc. seem to be in highly active use); and/or external data, such as stock market volatility in the case of a server or other system associated with a brokerage or other financial institution; etc.

Figure 6:
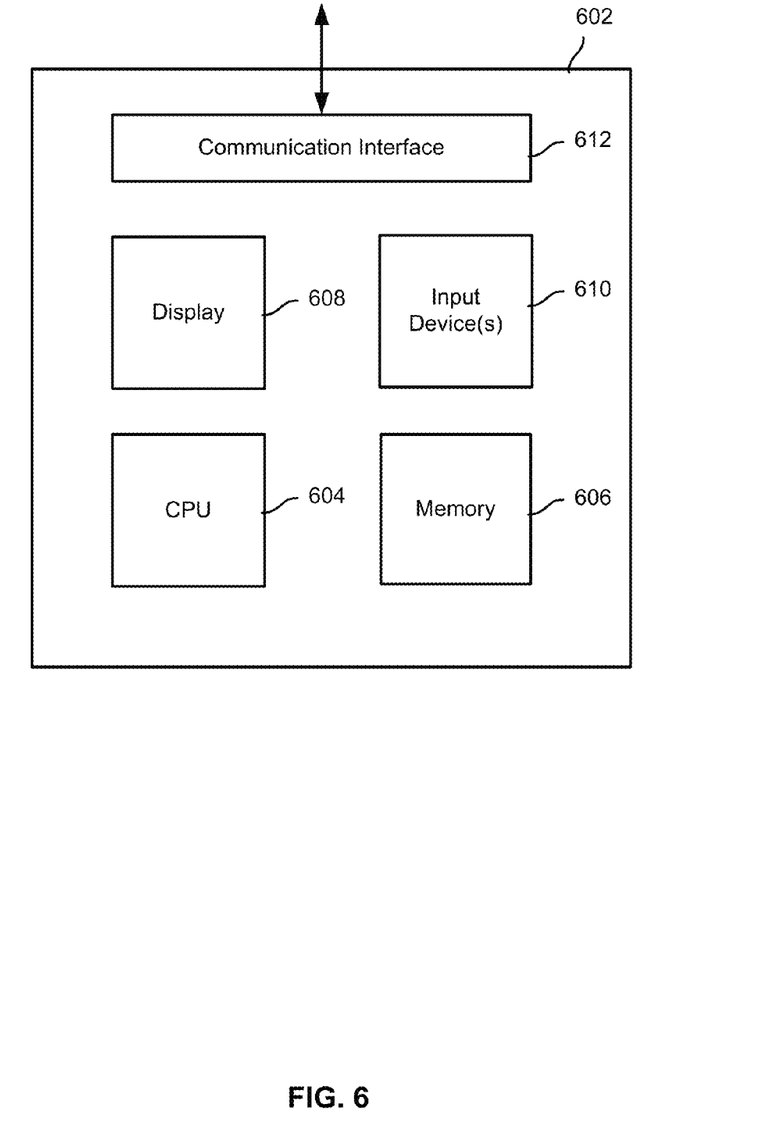
FIG. 6 is a block diagram illustrating an embodiment of a computer or other device configured to detect idle conditions.

FIG. 6 is a block diagram illustrating an embodiment of a computer or other device configured to detect idle conditions. In the example shown, the computer or other device 602 includes a CPU or other processor(s) 604, a memory 606, an integrated and/or peripheral display 608, an integrated and/or peripheral input device (e.g., hard/soft keyboard, mouse, resistive or capacitive touch display, etc.) 610, and a communication interface 612, such as network interface card and/or a mobile or other wireless communication interface, to provide network connectivity. Examples of device 602 include without limitation a personal, desktop, laptop, and/or other portable computer; a server or other centrally and/or remotely located computer; and a mobile phone, "smartphone", or other wireless device. In some embodiments, an idle detection process(es) executed by CPU 604 test for idle conditions and transition the device 602 into an idle state as disclosed herein. In some embodiments, idle detection logic comprising computer instructions stored in a non-volatile storage device (not shown), such as a flash or other hard drive, are executed by CPU 604 to perform the idle detection and associated processing disclosed herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method to detect an idle condition, comprising:
monitoring a set of one or more idle conditions, the set including one or more conditions not triggered by an absence of user input,
wherein the set of one or more idle conditions comprises a first set of conditions associated with a first level of idle condition testing,
wherein said first set of conditions includes: determining that an application is currently being displayed using an entire screen of a display device, determining that current CPU usage exceeds a specified threshold, and determining that a network adapter utilization exceeds a threshold;
determining that at least one of the first set of conditions has been met by serially testing in a predetermined order each of the first set of conditions;
evaluating, based at least in part on the determination that at least one of the first set of conditions have been determined to have been met, a second set of one or more idle post-conditions associated with a second level of idle condition testing, wherein each of the post-conditions in the one or more idle post-conditions identifies an idle test performed after concluding that the device is idle,
wherein said second set of conditions includes: determining if a current system time is between a specified time interval and determining whether an average CPU usage over an idle period exceeds a certain threshold; and
concluding based at least in part on the monitoring that the device is idle.

2. The method of claim 1, further comprising transitioning the device into an idle state based at least in part on the conclusion that the device is idle.

3. The method of claim 1, further comprising allowing a lower priority task to be performed based at least in part on the conclusion that the device is idle.

4. The method of claim 1, wherein the set of one or more idle conditions is monitored during an idle detection period.

5. The method of claim 4, further comprising computing a duration of the idle detection period.

6. The method of claim 5, wherein the duration is computed based at least in part on a first time associated with beginning said monitoring of the set of one or more idle conditions and a second time associated with a last of said one or more idle conditions being determined to have been met.

7. The method of claim 4, further comprising determining that a duration of the idle detection period exceeds a prescribed threshold.

8. The method of claim 7, wherein the conclusion that the device is idle is based at least in part on the determination that the duration of the idle detection period exceeds the prescribed threshold.

9. The method of claim 1, wherein the conclusion that the device is idle is based at least in part on a determination that both the first set of conditions and the second set of one or more idle post-conditions have been determined to have been met.

10. The method of claim 1, wherein said monitoring includes observing a value of a device operating parameter and comparing the observed value to a corresponding detection threshold.

11. The method of claim 1, wherein the particular conditions comprised within the first set of one or more conditions are determined dynamically.

12. The method of claim 1, wherein a threshold associated with a condition included in the first set of one or more conditions is determined programmatically based at least in part on an observed value of a corresponding device parameter as observed during a learning period.

13. The method of claim 1, further comprising performing a maintenance or repair operation based at least in part on the conclusion that the device is idle.

14. A system, comprising a processor configured to:
monitoring a set of one or more idle conditions, the set including one or more conditions not triggered by an absence of user input,
wherein the set of one or more idle conditions comprises a first set of conditions associated with a first level of idle condition testing,
wherein said first set of conditions includes: determining that an application is currently being displayed using an entire screen of a display device, determining that a current CPU usage exceeds a specified threshold, and determining that a network adapter's utilization exceeds a threshold;
determining that at least one of the first set of conditions has been met by serially testing in a predetermined order each of the first set of conditions;
evaluating, based at least in part on the determination that at least one of the first set of conditions have been determined to have been met, a second set of one or more idle post-conditions associated with a second level of idle condition testing, wherein each of the post-conditions in the one or more idle post-conditions identifies an idle test performed after concluding that the device is idle,
wherein said second set of conditions includes: determining if a current system time is between a specified time interval and determining whether an average CPU usage over an idle period exceeds a certain threshold; and
concluding based at least in part on the monitoring that the device is idle.

15. The system of claim 14, wherein the system comprises one or more of a computer, a server, a mobile phone, a smart phone, and a tablet.

16. The system of claim 14, further comprising a memory or other storage device configured to store the set of one or more idle conditions.

17. The system of claim 14, wherein the processor is further configured to allow a lower priority task to be performed based at least in part on the conclusion that the device is idle.

18. The system of claim 14, wherein the conclusion that the device is idle is based at least in part on a determination that an idle detection period exceeds a prescribed threshold.

19. The system of claim 14, wherein the conclusion that the device is idle is based at least in part on a determination that both the first set of conditions and the second set of one or more idle post-conditions have been determined to have been met.

20. A computer program product to detect an idle condition, the computer program product being embodied in a tangible, non-transitory computer readable storage medium and comprising computer instructions for:
monitoring a set of one or more idle conditions, the set including one or more conditions not triggered by an absence of user input,
wherein the set of one or more idle conditions comprises a first set of conditions associated with a first level of idle condition testing,
wherein said first set of conditions includes: determining that an application is currently being displayed using an entire screen of a display device, determining that a current CPU usage exceeds a specified threshold, and determining that a network adapter's utilization exceeds a threshold;
determining that at least one of the first set of conditions has been met by serially testing in a predetermined order each of the first set of conditions;
evaluating, based at least in part on the determination that at least one of the first set of conditions have been determined to have been met, a second set of one or more idle post-conditions associated with a second level of idle condition testing, wherein each of the post-conditions in the one or more idle post-conditions identifies an idle test performed after concluding that the device is idle,
wherein said second set of conditions includes: determining if a current system time is between a specified time interval and determining whether an average CPU usage over an idle period exceeds a certain threshold; and
concluding based at least in part on the monitoring that the device is idle.

21. The computer program product of claim 20, further comprising instructions for transitioning the device into an idle state based at least in part on the conclusion that the device is idle.

22. The computer program product of claim 20, further comprising instructions for allowing a lower priority task to be performed based at least in part on the conclusion that the device is idle.

23. The computer program product of claim 20, wherein the set of one or more idle conditions is monitored during an idle detection period.

24. The computer program product of claim 23, further comprising instructions for computing a duration of the idle detection period.

25. The computer program product of claim 24, wherein the duration is computed based at least in part on a first time associated with beginning said monitoring of the set of one or more idle conditions and a second time associated with a last of said one or more idle conditions being determined to have been met.

26. The method of claim 23, further comprising instructions for determining that a duration of the idle detection period exceeds a prescribed threshold.

27. The computer program product of claim 26, wherein the conclusion that the device is idle is based at least in part on the determination that the duration of the idle detection period exceeds the prescribed threshold.

28. The computer program product of claim 20, wherein the conclusion that the device is idle is based at least in part on a determination that both the first set of conditions and the second set of one or more idle post-conditions have been determined to have been met.

29. The computer program product of claim 20, wherein said monitoring includes observing a value of a device operating parameter and comparing the observed value to a corresponding detection threshold.

30. The computer program product of claim 20, wherein the particular conditions comprised within the first set of one or more conditions are determined dynamically.

31. The computer program product of claim 20, wherein a threshold associated with a condition included in the first set of one or more conditions is determined programmatically based at least in part on an observed value of a corresponding device parameter as observed during a learning period.

32. The computer program product of claim 20, further comprising instructions for performing a maintenance or repair operation based at least in part on the conclusion that the device is idle.

* * * * *